United States Patent Office 3,677,738
Patented July 18, 1972

3,677,738
METHOD FOR THE CONTROL OF PESTS WITH TRIORGANOTIN (SUBSTITUTED PHENOXIDES)
Pasquale P. Minieri, Woodside, N.Y., assignor to Tenneco Chemicals, Inc.
No Drawing. Original application Feb. 28, 1968, Ser. No. 708,802, now Patent No. 3,524,869, dated Aug. 11, 1970. Divided and this appplication Nov. 6, 1969, Ser. No. 871,262
Int. Cl. A01n 9/00
U.S. Cl. 71—97
19 Claims

ABSTRACT OF THE DISCLOSURE

Organotin compounds that have the structural formula

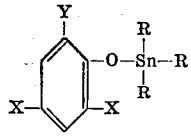

wherein each R represents an alkyl group having from 4 to 8 carbon atoms or a phenyl group; one of the X substituents represents an alkyl group having from 4 to 8 carbon atoms, phenyl, or methyl; the other X substituent represents hydrogen, halogen, nitro, or an alkyl group having from 1 to 4 carbon atoms; and Y represents hydrogen, halogen, or nitro are useful in the control of the growth of undesirable organisms.

---

This is a division of my application Ser. No. 708,802, which was filed on Feb. 28, 1968 and which is now U.S. Pat. 3,524,869.

This invention relates to novel organotin compounds. More particularly it relates to substituted phenoxy tin compounds and to a process for their preparation. It further relates to the use of these compounds in the control of the growth of undesirable organisms.

In accordance with this invention I have discovered that certain substituted phenoxy tin compounds have unusual and valuable activity as marine antifouling agents, as selective herbicides, as insecticides, and as agricultural fungicides. These compounds have the structural formula

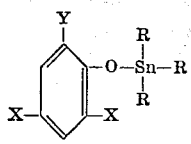

wherein each R represents an alkyl group having from 4 to 8 carbon atoms or a phenyl group; one of the X substituents represents an alkyl group having from 4 to 8 carbon atoms, a phenyl group, or a methyl group; the other X substituent represents hydrogen, an alkyl group having from 1 to 4 carbon atoms, a halogen atom, or a nitro group; and Y represents a hydrogen atom, a halogen atom, or a nitro group. Illustrative of these compounds are the following:

tri-n-butyl(4-chloro-6-phenylphenoxy) tin;
tri-n-butyl(2,4-dichloro-6-phenylphenoxy) tin;
tri-n-butyl(2,4-dinitro-6-phenylphenoxy) tin;
tri-n-butyl(4-menthylphenoxy) tin;
tri-n-butyl(2-methyl-4-menthylphenoxy) tin;
tri-n-butyl(2-butyl-4,6-dinitrophenoxy) tin;
tri-n-butyl(2-hexyl-4,6-dichlorophenoxy) tin;
trioctyl(2,4-dichloro-6-phenylphenoxy) tin;
triphenyl(2-phenyl-4-chlorophenoxy) tin;
triphenyl(2,4-dibromo-6-phenylphenoxy) tin;
triphenyl(2,4-dinitro-6-phenylphenoxy) tin;
triphenyl(4-menthylphenoxy) tin;
triphenyl(2-methyl-4-menthylphenoxy) tin;
triphenyl(2-butyl-4,6-dinitrophenoxy) tin;
triphenyl(2-octyl-4,6-dichlorophenoxy) tin;
triphenyl(2-octyl-4,6-dinitrophenoxy) tin; and the like.

The substituted phenoxy tin compounds may be prepared by any suitable and convenient procedure. For example, they may be prepared by the reaction of a substituted phenol with triphenyl tin hydroxide or a trialkyl tin hydroxide in a hydrocarbon or ketone solvent or by the reaction of an alkali metal salt of a substituted phenol with triphenyl tin chloride or a trialkyl tin chloride in a suitable solvent.

The compounds of this invention may be applied to a wide variety of plant and animal pests to control or inhibit their growth. While each of these compounds has been found to be effective in the control of the growth of certain of the aforementioned pests, the particular type of organism upon which each exerts its major effect is largely dependent upon the nature of the substituents on the phenoxy group and on the tin atom. Thus, it has been found that tributyl(2,4-dichloro-6-phenylphenoxy) tin and tributyl(2-sec. butyl-4,6-dinitrophenoxy) tin are particularly effective as selective herbicides, while triphenyl(4-chloro-6-phenylphenoxy) tin and triphenyl(4-menthylphenoxy) tin are most useful as insecticides and as fungicides. Triphenyl(2,4-dichloro-6-phenylphenoxy) tin is most active in the control of barnacles and other marine organisms.

The locus in which pest control is to be effected may, if desired, be treated with the compounds of this invention, or the compounds may be applied directly to the organisms whose growth is to be controlled.

While the substituted phenoxy tin compounds may be used as such in the control of the growth of undesirable organisms, they are usually and preferably used in combination with an inert carrier which facilitates the dispensing of dosage quantities of the compounds and assists in their absorption by the organism. The pesticidal compounds may be mixed with or deposited upon inert particulate solids, such as fullers earth, talc, diatomaceous earth, hydrated calcium silicate, kaolin, and the like to form dry particulate compositions. Such compositions may, if desired, be dispersed in water with or without the aid of surface-active agents. The pesticidal compounds are preferably dispensed in the form of solutions or dispersions in inert organic solvents, water or mixtures of inert organic solvents and water, or as oil-in-water emulsions. The concentration of the active materials in the pesticidal compositions may vary within wide limits and depends upon a number of factors, the most important of which are the type or types of undesirable organisms being treated and the amount of the composition to be applied. If desired, mixtures of two or more of the novel compounds as well as other pesticidal compounds may be present in the compositions.

The invention is further illustrated by the examples that follow.

EXAMPLE 1

To a solution of 23.9 grams (0.1 mole) of 2,4-dichloro-6-phenylphenol in 200 ml. of methyl ethyl ketone was slowly added 11.4 grams (0.1 mole) of a 50 percent by weight aqueous potassium hydroxide solution. The resulting solution was stirred for one hour and allowed to cool to room temperature. To this solution was slowly added 38.6 grams (0.1 mole) of triphenyl tin chloride. The reaction mixture was heated at its reflux temperature for eight hours, cooled, and filtered. The filtrate was evaporated to dryness, and the residue was dissolved in chloroform. The chloroform solution was washed with water and then heated to remove some of the solvent. The two crops of crystalline product that were obtained were combined and then recrystallized from petroleum ether. There was obtained an 83 percent yield of triphenyl (2,4-dichloro-6-phenylphenoxy) tin, which melted at 142°–144° C. and contained 11.5 percent of chlorine and 20.5 percent of tin (calculated for $C_{30}H_{22}OCl_2Sn$, 12.0% Cl and 20.0% Sn).

EXAMPLE 2

2,4-dichloro-6-phenylphenol was prepared by heating 170.2 grams (1 mole) of 6-phenylphenol to about 60° C. to 70° C., passing gaseous chlorine through the molten material until 142 grams (2.0 moles) of chlorine had reacted, and then sparging the chlorinated reaction mixture with air to remove dissolved hydrogen chloride. A 100% yield of crude 2,4-dichloro-6-phenylphenol was obtained.

A mixture of 23.9 grams (0.1 mole) of 2,4-dichloro-6-pheylphenl, 36.7 grams (0.1 mole) of triphenyl tin hydroxide, and 150 ml. of toluene was heated at its reflux temperature for about one hour during which time 1.8 ml. of water was collected by azeotropic distillation. The reaction mixture was cooled in an ice bath and filtered to yield 25 grams of product melting at 140°–143° C. The filtrate was evaporated to dryness. The residue was dissolved in a small amount of hot toluene. The toluene solution was cooled, and 2 volumes of ligroin was added to it. Upon filtration, an additional 22.6 grams of product melting at 144°–146° C. was obtained. By this procedure, there was obtained an 81 percent yield of triphenyl (2,4-dichloro-6-phenylphenoxy) tin, which contained 11.8 percent of chlorine (calculated 12.0 percent). The infrared absorption spectrum of this product was substantially identical to that of the product of Example 1.

EXAMPLE 3

To a solution of 23.9 grams (0.1 mole of) 2,4-dichloro-6-phenylphenol in 200 ml. of methyl ethyl ketone was slowly added first 11.4 grams (0.1 mole) of a 50 percent by weight aqueous potassium hydroxide solution and then 29 grams of tributyl tin chloride. The reaction mixture was heated at its reflux temperature for eight hours, cooled and filtered. The filtrate was evaporated to dryness, and the residue was dissolved in chloroform. The chloroform solution was washed with water and then heated to remove the solvent. There was obtained a 92 percent yield of tributyl(2,4-dichloro-6-phenylphenoxy) tin, a yellow liquid which contained 13.5 percent of chlorine and 23.6 percent of tin (calculated for $C_{24}H_{34}OCl_2Sn$, 13.4% Cl and 22.3% Sn).

EXAMPLES 4–9

Using the procedure described in Example 1, other substituted phenoxy tin compounds were prepared. These products and their analyses are listed in Table I.

TABLE I

| Ex. No. | Compound | Yield (percent) | Percent Sn Found | Percent Sn Calcd. | Percent N Found | Percent N Calcd. |
|---|---|---|---|---|---|---|
| 4 | Tributyl(2-sec.butyl-4,6-dinitrophenoxy)tin | 88.7 | 21.5 | 22.1 | 4.9 | 5.3 |
| 5 | Tributyl(2-methyl-4-menthylphenoxy)tin | 100 | 22.0 | 22.1 | | |
| 6 | Triphenyl(2,4-dinitro-6-phenylphenoxy)tin | 91 | 19.8 | 19.4 | 4.2 | 4.6 |
| 7 | Triphenyl(4-chloro-6-phenylphenoxy)tin | | 22.0 | 21.5 | | |
| 8 | Triphenyl(2-methyl-4-menthylphenoxy)tin | | 18.6 | 19.8 | | |
| 9 | Triphenyl(4-menthylphenoxy)tin | | 19.3 | 20.2 | | |

EXAMPLE 10

Acetone solutions were prepared by dissolving 100 mg. portions of the products of Examples 1–9 in 10 ml. of acetone and contained 2000 p.p.m. of sorbitan trioleate and 5000 p.p.m. of a polyoxyethylene ether of sorbitan monooleate. The acetone solutions were dispersed in 90 ml. portions of distilled water to form aqueous solutions that contained 1000 p.p.m. of the organotin compound. More dilute solutions were prepared by adding distilled water to these solutions.

EXAMPLE 11

A series of tests was carried out in which the substituted phenoxytin compounds were evaluated as selective herbicides. In these tests groups of greenhouse flats containing soil were planted with seeds of various crop plants and weeds. In the preemergence tests the soil after planting was sprayed with an aqueous solution prepared according to the procedure of Example 10. In the post-emergence tests the solution was applied two to four weeks after planting. The effectiveness of the treatment was determined by comparing the treated plants with untreated plants. In Tables II and III a rating of "0" indicates no herbicidal activity; "1"–"3" indicates slight injury; "4"–"6" indicates moderate injury; "7"–"9" indicates severe injury; and "10" indicates destruction of all plants.

TABLE II.—ACTIVITY OF SUBSTITUTED PHENOXY TIN COMPOUNDS AS PREEMERGENCE HERBICIDES

| Ex. No. | Herbicide | Dossage, #/acre | Clover | Sugar beet | Soy bean | Corn | Wheat | Oats | Mustard | Morning glory | Buckwheat | Crab grass | Rye grass | Foxtail |
|---|---|---|---|---|---|---|---|---|---|---|---|---|---|---|
| A | Product of Ex. 3 | 10 | 10 | 4 | 10 | 10 | 0 | 0 | 10 | 7 | 9 | 10 | 9 | 10 |
|   |   | 5 | 0 | 5 | 5 | 10 | 0 | 0 | 10 | 0 | 0 | 9 | 9 | 9 |
|   |   | 2.5 | 0 | 0 | 0 | 8 | 0 | 0 | 9 | 0 | 0 | 5 | 0 | 5 |
| B | Product of Ex. 4 | 10 | 5 | 9 | 10 | 10 | 0 | 0 | 10 | 10 | 9 | 10 | 10 | 10 |
|   |   | 5 | 0 | 8 | 9 | 10 | 0 | 0 | 10 | 4 | 5 | 10 | 9 | 9 |
|   |   | 2.5 | 0 | 0 | 0 | 10 | 0 | 0 | 10 | 0 | 0 | 10 | 9 | 9 |
| C | Product of Ex. 5 | 10 | 10 | 0 | 0 | 0 | 0 | 0 | 10 | 0 | 0 | 0 | 0 | 0 |

TABLE III.—ACTIVITY OF SUBSTITUTED PHENOXY TIN COMPOUNDS AS POSTEMERGENCE HERBICIDES

| Ex. No. | Herbicide | Dosage, #/acre | Clover | Sugar beet | Soy bean | Corn | Wheat | Oats | Mustard | Morning glory | Buckwheat | Crab grass | Rye grass | Foxtail |
|---|---|---|---|---|---|---|---|---|---|---|---|---|---|---|
| D | Product of Ex. 1 | 10 | 10 | 10 | 10 | 10 | 7 | 8 | 10 | 10 | 10 | 4 | 8 | 4 |
| E | Product of Ex. 3 | 10 | 10 | 10 | 10 | 10 | 9 | 9 | 10 | 10 | 10 | 10 | 10 | 10 |
|   |                  | 5  | 10 | 10 | 10 | 10 | 8 | 9 | 10 | 10 | 10 | 10 | 10 | 10 |
|   |                  | 2.5| 8  | 9  | 10 | 10 | 8 | 9 | 10 | 10 | 10 | 10 | 9  | 10 |
| F | Product of Ex. 4 | 10 | 10 | 10 | 10 | 10 | 8 | 10| 10 | 10 | 10 | 10 | 10 | 10 |
|   |                  | 5  | 10 | 10 | 10 | 10 | 7 | 9 | 10 | 10 | 10 | 10 | 10 | 10 |
|   |                  | 2.5| 10 | 10 | 10 | 10 | 5 | 9 | 10 | 10 | 10 | 10 | 10 | 10 |
| G | Product of Ex. 5 | 10 | 10 | 10 | 10 | 10 | 9 | 8 | 10 | 10 | 10 | 10 | 5  | 9 |
|   |                  | 10 | 10 | 10 | 10 | 8  | 6 | 6 | 10 | 10 | 10 | 6  | 4  | 2 |
| H | Product of Ex. 6 | 5  | 10 | 8  | 10 | 6  | 2 | 4 | 10 | 10 | 10 | 8  | 8  | 8 |
|   |                  | 2.5| 8  | 6  | 8  | 6  | 3 | 6 | 10 | 6  | 8  | 6  | 6  | 5 |
|   |                  | 1.25| 6 | 4  | 6  | 5  | 3 | 2 | 8  | 5  | 4  | 2  | 3  | 3 |
| I | Product of Ex. 7 | 10 | 10 | 6  | 8  | 6  | 5 | 5 | 10 | 4  | 9  | 3  | 4  | 2 |
|   |                  | 5  | 6  | 5  | 6  | 6  | 4 | 4 | 6  | 4  | 6  | 2  | 2  | 2 |

EXAMPLE 12

A series of tests was carried out in which solutions prepared according to the procedure of Example 10 were applied to plants infested with southern army worms, 2-spotted spinder mites, aphids, or houseflies. In no case was there appreciable injury to the plants. The results obtained are summarized in Table IV.

The terms and expressions which have been employed are used as terms of description and not of limitation. There is no intention in the use of such terms and expressions of excluding any equivalents of the features shown and described or portions thereof; it is however, recognized that various modifications are possible within the scope of the invention claimed.

TABLE IV.—ACTIVITY OF SUBSTITUTED PHENOXY TIN COMPOUNDS AS INSECTICIDES

| Ex. No. | Insecticide | Conc. of insecticide in solution (p.p.m.) | Percent control — Southern army worm | 2-spotted spider mites | Aphids | House flies |
|---|---|---|---|---|---|---|
| A | Product of Ex. 1 | 1,000 | 20  | 100 | 13  | 17 |
|   |                  | 100   |     | 61  |     |    |
| B | Product of Ex. 5 | 500   |     | 100 | 100 |    |
|   |                  | 250   |     | 100 | 90  |    |
|   |                  | 50    |     | 100 | 50  |    |
| C | Product of Ex. 6 | 1,000 | 100 | 100 | 100 | 40 |
|   |                  | 250   | 100 | 100 | 77  |    |
|   |                  | 50    | 100 | 61  | 35  |    |
| D | Product of Ex. 7 | 1,000 | 100 | 50  | 80  | 40 |
|   |                  | 250   | 100 |     | 80  |    |
|   |                  | 50    | 100 |     | 0   |    |
| E | Product of Ex. 8 | 1,000 | 100 |     | 100 |    |
|   |                  | 250   | 80  |     | 100 |    |
|   |                  | 50    | 10  |     | 80  |    |
| F | Product of Ex. 9 | 1,000 | 100 |     | 80  | 100 |
|   |                  | 250   | 100 |     |     | 65 |
|   |                  | 50    | 80  |     |     | 0  |

EXAMPLE 13

Tender green bean plants with fully expanded primary leaves were inoculated with spores of *Erysiphe polygoni*, the powdery mildew fungus. Forty-eight hours later, the plants were sprayed with aqueous solutions prepared by the procedure of Example 10. After a period of 7–10 days, the degree of suppression of the disease was noted. The results obtained are summarized in Table V.

TABLE V.—ACTIVITY OF SUBSTITUTED PHENOXY TIN COMPOUNDS IN CONTROL OF POWDERY MILDEW OF BEAN

| Ex. No. | Fungicide | Conc. of fungicide in solution (p.p.m.) | Control of powdery mildew |
|---|---|---|---|
| A | Product of Ex. 7 | 1,000 | Excellent. |
|   |                  | 500   | Do. |
|   |                  | 100   | Good. |
|   |                  | 20    | Do. |
| B | Product of Ex. 8 | 1,000 | Do. |
|   |                  | 500   | Do. |
|   |                  | 100   | Fair. |
| C | Product of Ex. 9 | 1,000 | Excellent. |
|   |                  | 500   | Do. |
|   |                  | 100   | Good. |

What is claimed is:

1. The method for the control of plant growth that comprises applying to the plants a phytotoxic amount of a herbicidal compound having the structural formula

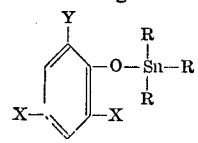

wherein each R represents a member selected from the group consisting of phenyl and alkyl groups having from 4 to 8 carbon atoms; one of the X substituents represents a member selected from the group consisting of phenyl and menthyl; the other X substitutent represents a member selected from the group consisting of hydrogen, halogen, nitro, and alkyl groups having from 1 to 4 carbon atoms; and Y represents a member selected from the group consisting of hydrogen, halogen, and nitro.

2. The method of claim 1 wherein the herbicidal compound is tributyl (2,4-dichloro-6-phenylphenoxy) tin.

3. The method of claim 1 wherein the herbicidal compound is triphenyl (4-menthylphenoxy) tin.

4. The method of claim 1 wherein the herbicidal compound is tributyl(2-methyl-4-menthylphenoxy) tin.
5. The method of claim 1 wherein the herbicidal compound is triphenyl(2-methyl-4-menthylphenoxy) tin.
6. The method of claim 1 wherein the herbicidal compound is triphenyl(2,4-dichloro-6-phenylphenoxy) tin.
7. The method of claim 1 wherein the herbicidal compound is triphenyl(2,4-dinitro-6-phenylphenoxy) tin.
8. The method for the control of plant growth which comprises applying to the locus to be treated a phytotoxic amount of a herbicidal compound having the structural formula

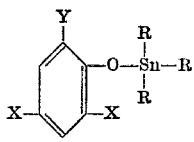

wherein each R represents a member selected from the group consisting of phenyl and alkyl groups having from 4 to 8 carbon atoms; one of the X substituents represents a member selected from the group consisting of phenyl and menthyl; the other X substituent represents a member selected from the group consisting of hydrogen, halogen, nitro, and alkyl groups having from 1 to 4 carbon atoms; and Y represents a member selected from the group consisting of hydrogen, halogen, and nitro.

9. The method of claim 8 wherein the herbicidal compound is tributyl(2,4-dichloro-6-phenylphenoxy) tin.
10. The method of claim 8 wherein the herbicidal compound is tributyl(2-methyl-4-menthylphenoxy) tin.
11. The method for the control of fungi that comprises contacting the fungi with a fungicidal amount of a compound having the structural formula

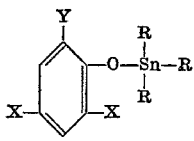

wherein each R represents a member selected from the group consisting of phenyl and alkyl groups having from 4 to 8 carbon atoms; one of the X substituents represents a member selected from the group consisting of phenyl and menthyl; the other X substituent represents a member selected from the group consisting of hydrogen, halogen, nitro, and alkyl groups having from 1 to 4 carbon atoms; and Y represents a member selected from the group consisting of hydrogen, halogen, and nitro.

12. The method of claim 11 wherein the fungicidal compound is triphenyl(4-chloro-6-phenylphenoxy) tin.
13. The method of claim 11 wherein the fungicidal compound is triphenyl(4-menthylphenoxy) tin.
14. The method of claim 11 wherein the fungicidal compound is triphenyl(2-methyl-4-menthylphenoxy) tin.
15. The method for the control of insects that comprises contacting the insects with an insecticidal amount of a compound having the structural formula

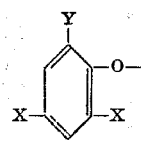

wherein each R represents a member selected from the group consisting of phenyl and alkyl groups having from 4 to 8 carbon atoms; one of the X substituents represents a member selected from the group consisting of phenyl and menthyl; the other X substituent represents a member selected from the group consisting of hydrogen, halogen, nitro, and alkyl groups having from 1 to 4 carbon atoms; and Y represents a member selected from the group consisting of hydrogen, halogen, and nitro.

16. The method of claim 15 wherein the insecticidal compound is triphenyl(4-menthylphenoxy) tin.
17. The method of claim 15 wherein the insecticidal compound is triphenyl(2,4-dinitro-6-phenylphenoxy) tin.
18. The method of claim 15 wherein the insecticidal compound is triphenyl(2-methyl-4-menthylphenoxy) tin.
19. The method of claim 15 wherein the insecticidal compound is tributyl(2-methyl-4-menthylphenoxy) tin.

References Cited

UNITED STATES PATENTS

| | | | |
|---|---|---|---|
| 3,321,365 | 5/1967 | Mennetal | 424—288 X |
| 3,284,296 | 11/1966 | Freiberg | 424—288 X |
| 3,499,086 | 3/1970 | Brueckner | 71—97 X |
| 3,129,236 | 4/1964 | Weissenberger | 71—97 X |
| 3,117,146 | 1/1964 | Zweigle et al. | 424—288 X |
| 3,031,483 | 4/1962 | Koopmans | 71—97 X |

OTHER REFERENCES

Farbwerke Hoechst, British Pat. 797,073 "Organotin compounds as fungicides and bactericides," Chem. Abst., vol. 53, (1959), 22714h.

LEWIS GOTTS, Primary Examiner

C. L. MILLS, Assistant Examiner

U.S. Cl. X.R.

424—288

UNITED STATES PATENT OFFICE
CERTIFICATE OF CORRECTION

Patent No. 3,677,738           Dated  July 18, 1972

Inventor(s)   Pasquale P. Minieri

It is certified that error appears in the above-identified patent and that said Letters Patent are hereby corrected as shown below:

Column 1, line 26, change "methyl" to -- menthyl --.

Column 1, line 56, change "methyl" to -- menthyl --.

Signed and sealed this 24th day of October 1972.

(SEAL)
Attest:

EDWARD M. FLETCHER, JR.
Attesting Officer

ROBERT GOTTSCHALK
Commissioner of Patents